No. 681,711. Patented Sept. 3, 1901.
G. R. KENNEDY.
NUT LOCK.
(Application filed Apr. 1, 1901.)
(No Model.)
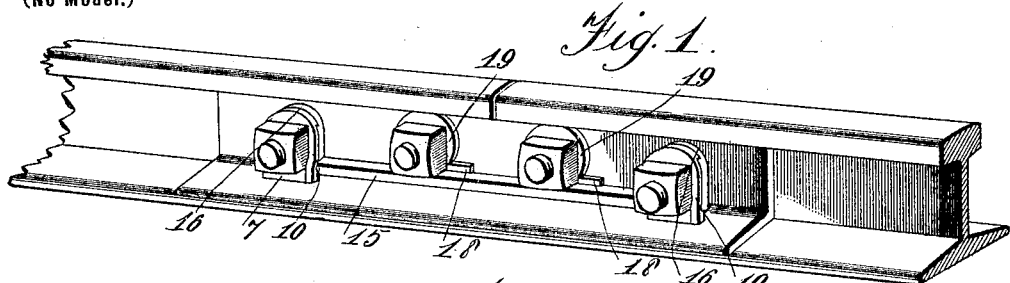
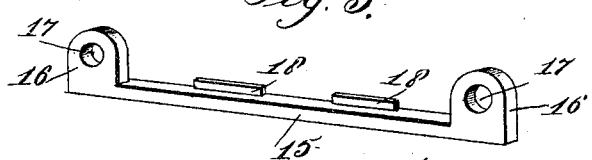
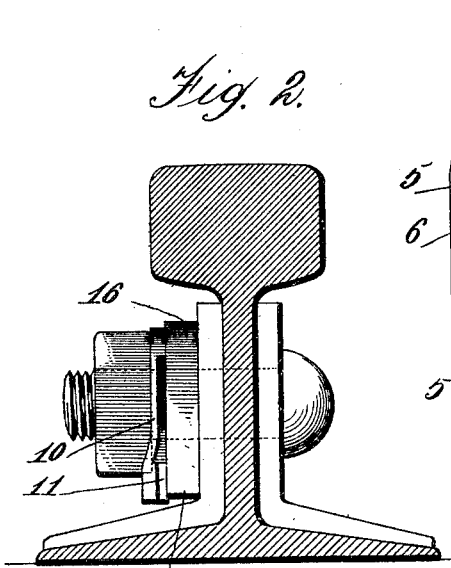
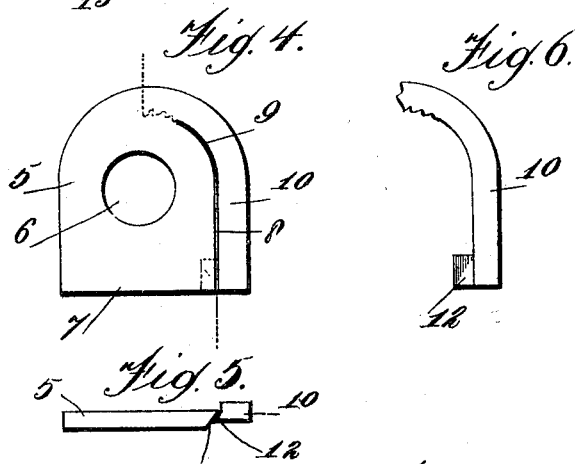
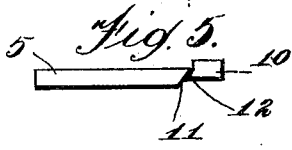
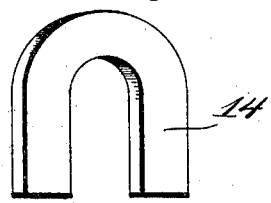
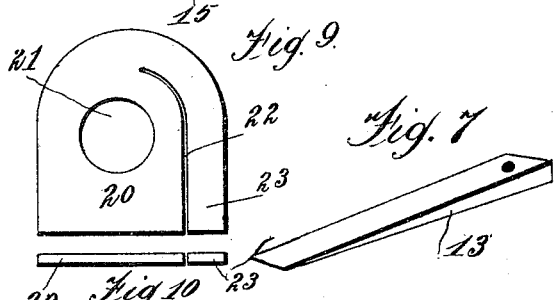
Witnesses:
Gordon R. Kennedy, Inventor
By Marion & Marion
Attorneys

UNITED STATES PATENT OFFICE.

GORDON REID KENNEDY, OF WINCHESTER, CANADA.

NUT-LOCK.

SPECIFICATION forming part of Letters Patent No. 681,711, dated September 3, 1901.

Application filed April 1, 1901. Serial No. 53,753. (No model.)

*To all whom it may concern:*

Be it known that I, GORDON REID KENNEDY, a subject of His Majesty the King of Great Britain, residing at Winchester, county of Dundas, Province of Ontario, Canada, have invented certain new and useful Improvements in Nut-Locks; and I do hereby declare that the following is a full, clear, and exact description of the invention, such as will enable others skilled in the art to which it appertains to make and use the same.

My invention relates to improvements in nut-locks which may be used singly in connection with one bolt or may be employed in multiple form conjunctively with a series of bolts.

One object of the invention is to provide a simple and efficient locking-washer capable of easy application to a bolt before tightening the nut, said washer having a yieldable element which gives to the movement of the nut when the latter is turned in one direction, but which effectually prevents the nut from turning in the opposite direction and becoming loose on the bolt.

A further object is to so construct the locking-washer as to enable releasing devices to be used in connection therewith, thereby permitting the locking-washer to be so manipulated as to enable removal of the nut without injury to the washer, and hence secure the subsequent removal of the washer in a complete condition, to the end that it may be repeatedly employed.

A further object is to provide a multiple bolt-engaging appliance adapted to lock a series of nuts and constructed in a way which will effectually prevent displacement of said locking appliance by being pried out of position.

With these ends in view the invention consists in the novel construction and arrangement of parts, which will be hereinafter fully described and claimed.

In the drawings hereto annexed, forming a part of this specification, Figure 1 is a perspective view illustrating the multiple locking device. Fig. 2 is a vertical cross-section, on an enlarged scale, through a rail-joint and showing the locking device in edge view. Fig. 3 is a detail perspective view of the multiple locking-bar. Fig. 4 is an enlarged view in elevation of the single nut-lock. Fig. 5 is an edge view of the part shown by Fig. 4, looking at the bottom edge thereof. Fig. 6 is a detail view of the yieldable locking-dog forming a part of the washer, illustrated by Figs. 4 and 5. Fig. 7 is a detail view of a releasing-wedge, and Fig. 8 is a similar view of a releasing-plate. Figs. 9 and 10 are views in side elevation and edge elevation of a simpler form of locking-washer.

The same numerals of reference denote like parts in each of the several figures of the drawings.

The nut-lock contemplated by this invention essentially comprises a plate or washer 5, the same having a bolt-hole 6 and a straight bottom edge 7. This plate or washer has an incision or slit 8, which is parallel to a side edge of the unslitted or solid portion of the washer, said slit being curved, as at 9. (See Fig. 4.) The provision of the slit 8 and its curved portion 9 secures a yieldable locking-dog 10, the same being laterally bent or deflected with relation to the plane of the washer, as shown by Fig. 5, whereby the locking-dog presents an edge or shoulder in the path of a corner of the nut, so that the nut will bear against the shoulder and be locked or held thereby against rotation in that direction which tends to unscrew the nut from the bolt. The locking-dog is joined to and forms an integral part of the washer by reason of the termination of the slit 9 at a point to one side of the bolt-hole 6, the spring or elasticity of the dog being determined by the length of the slit 9; but it is evident that the slit may be extended, as represented by the broken line in Fig. 4, when it is desired to vary the strength of the locking-dog. As shown by Fig. 5, the edge of the washer next to the slit 8 is beveled or inclined, as at 11, and the locking-dog has its inner edge formed with an offset or shoulder 12, (see Figs. 5 and 6,) which offset or shoulder is beveled correspondingly to the bevel 11, whereby the offset is adapted to impinge the beveled edge 11 of the washer, and thus limit the lateral displacement of the locking-dog relative to the plane of the washer.

In using the single nut-lock the washer is slipped on the bolt after the same has been adjusted in the work, and the nut is then screwed on the bolt until it touches the washer. A corner of the nut first engages with the deflected spring-dog, so as to press the latter inwardly a sufficient distance to permit the nut to turn, and after the corner of the nut passes the dog the latter is repressed by the adherent elasticity of the washer, so as to again lie in the path of an approaching corner of the nut. This action is repeated until the nut is screwed home, and the locking-dog engages with one edge of the nut to prevent the latter from turning backward.

When it is desired to remove the washer, I employ the key or wedge 13 and the releasing-plate 14. (Shown, respectively, by Figs. 7 and 8.) The key is first inserted between the washer and its locking-dog, so as to press the latter away from engagement with the nut. Said nut is now turned a sufficient distance away from the washer for the operator to slip the releasing-plate 14 over the bolt and interpose said plate between the nut and the washer, after which the nut is again turned inwardly, so as to make the releasing-plate press the spring-dog backwardly sufficiently for the removal of the key or wedge. The parts may now be taken off by unscrewing the nut from the bolt.

In the multiple form of nut-lock a bar 15 is provided with the upstanding lugs 16, the same being pierced by bolt-holes 17. This bar is formed with one or more raised flanges 18, and although I have shown said bar in Fig. 1 as having two flanges it is to be understood that a single flange may be provided on the bar, or the number of flanges may be increased to more than two, as may be found expedient. This locking-bar may be used in connection with four bolts, as shown by Fig. 1, or it may be employed on a rail-joint having a series of six bolts. In either event the bar should be long enough for the lugs 16 to engage with the end bolts of the series and for one or more of the flanges 18 to rest in rear of the nuts on the intermediate bolts. The intermediate bolts and their nuts are first placed in position, and behind the nut which is to be engaged by the flange 18 is placed a spacing-washer 19. (See Fig. 1.) The locking-bar 15 is now inserted in place, so as to rest upon the fish-plate and to engage with the intermediate nuts, although the position of the locking-bar may be inverted, so as to place the same beneath the head of the rail and to engage with the top edges of the nuts. The end bolts are now placed in position and engaged with the lugs 16 of the locking-bar. The washers 5 are fitted on the end bolts and in positions for the lower edges 7 of said washers to rest upon the fish-plate, and, finally, the nuts on the end bolts are screwed into place, so as to be engaged and locked by the dogs 10 of said washers 5.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Although I have shown and described the nut-locking washer as having a beveled edge 11 and the offset or shoulder 12 on the yieldable dog, I do not desire to strictly confine myself to this particular construction, because I am aware that these portions of the lock may be omitted. In fact, the simplest form of the nut-lock is represented by Figs. 9 and 10, and this lock is adapted to be used on plain work or in places where it is desired to confine a nut from rotation on its bolt. In this style of nut-lock the plate 20 has the usual bolt-hole 21 and the incision 22, which forms the yieldable dog 23, the whole being stamped from a single piece of spring metal. As represented by Fig. 10, the dog is in the plane of the plate; but it is evident that this dog may be projected or bent so as to afford the desired abutment for the nut.

Another modification which I may make in the construction of my nut-lock is the omission of the flange or flanges 18 from the bar 15, the latter adapted to lock a series of nuts in position. When a bar 15 having one or more flanges 18 is employed, the flange or flanges prevent the bar from being pried out of place; but it is evident that a plain or unflanged bar may be employed to lock the nuts in place, said bar having engagement with the end nuts of the series.

I claim—

1. A nut-locking washer comprising a plate provided with a yieldable locking-dog, the same having an offset or shoulder which is disposed in engaging relation to a beveled edge of said plate, substantially as described.

2. The combination with bolts, and their nuts, of a locking-bar provided with one or more flanges adapted to fit in rear of a nut and also provided with lugs for engagement with end bolts of a series, and locking-washers fitted on the end bolts of the series and having locking-dogs which engage with the nuts on said bolts, substantially as described.

In witness whereof I have hereunto set my hand in the presence of two witnesses.

GORDON REID KENNEDY.

Witnesses:
 WILLIE BRAITHWAITE,
 GRANT EARLY.